July 9, 1929.  H. S. McCLELLAN  1,720,634
AUTOMOBILE DECKING
Filed April 21, 1928

INVENTOR
HARRY S. McCLELLAN.
BY
John Harness
ATTORNEY

Patented July 9, 1929.

1,720,634

UNITED STATES PATENT OFFICE.

HARRY S. McCLELLAN, OF DETROIT, MICHIGAN, ASSIGNOR TO CHRYSLER CORPORATION, OF DETROIT, MICHIGAN, A CORPORATION OF DELAWARE.

AUTOMOBILE DECKING.

Application filed April 21, 1928. Serial No. 271,927.

This invention relates to a means for supporting an automobile in a freight car and more particularly to a device for preventing the support from rubbing on the wheels of the automobile when the latter is supported from the axle without removal of the wheels.

An object of the invention is to provide a member adapted to be screw threaded on to the hub and to support that member in braces extending from the floor of the car. Lateral supports are provided to brace the automobile against lateral movement within the car.

Other objects and advantages will more fully appear from the following description taken in connection with the accompanying drawings in which.

Figure 1:
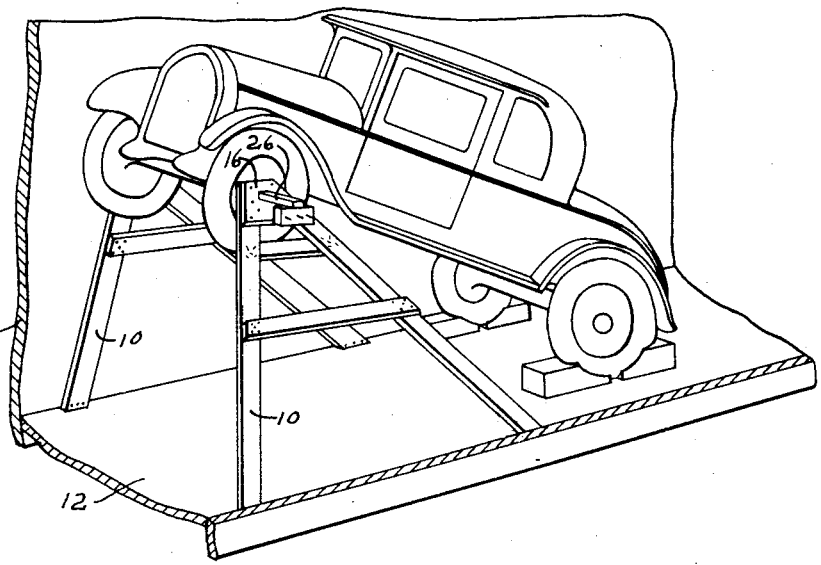
Fig. 1 is a perspective view showing a portion of the freight car having an automobile supported therein.
Figure 2:
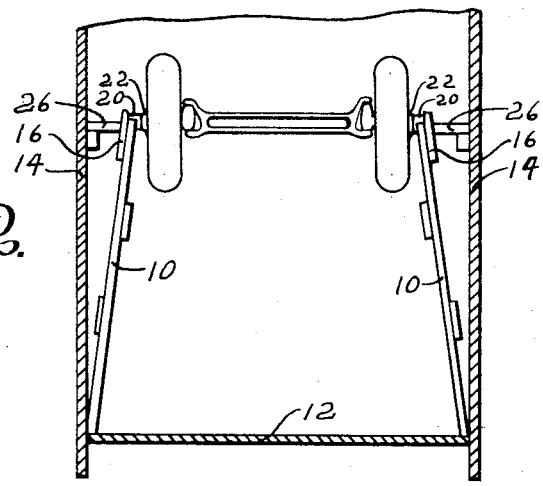
Fig. 2 is a sectional view through the car showing a portion of the automobile in raised position.
Figure 3:
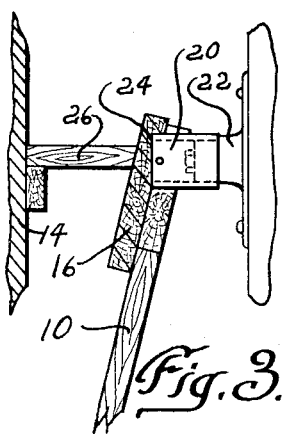
Fig. 3 is a fragmentary view showing on an enlarged scale a supporting member which is secured to the hub.
Figure 4:
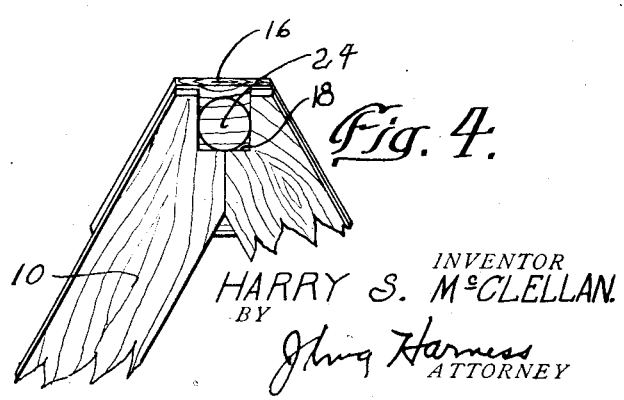
Fig. 4 is a side view of Fig. 3 with the wheel removed.

Referring to the drawings, a pair of brace members 10 have been shown extending diagonally upward from the floor 12 of the car and inwardly from the sides 14. Each brace member 10 is A shaped consisting of a pair of uprights joined at the top by a block 16. A recess 18 is formed in the upper edge of the two uprights which supports a sleeve 20 adapted to be screw threaded to the hub 22 of the automobile wheel. The block 16 is recessed as at 24 to provide an abutment for the outer end of the sleeve 20; the recess 24 being immediately behind the recess 18. Extending horizontally from the sides of the car are braces 26 which hold the block 16 against the sleeve 20 and prevent lateral movement of the automobile.

By providing a means for securing the axle in elevated position which means projects beyond the end of the axle, a construction has been provided which prevents rubbing of the wheel and removes the necessity of wrapping the supporting member.

It will be obvious that various changes may be made in the arrangement, combination and construction of the various parts of my improved device without departing from the spirit of my invention and it is my intention to cover by my claims such changes as may reasonably be included within the scope thereof.

What I claim is:

1. A decking structure for securing automobiles in freight cars comprising, a hub engaging member adapted to be secured to the hub of an automobile wheel, a brace member forming a support in a vertical plane, a block secured to the upper end of said brace provided with a closed recess to receive the end of said hub engaging member, supporting it laterally.

2. A decking structure for securing automobiles in freight cars comprising, a hub engaging member adapted to be screw threaded to the hub of an automobile wheel, a brace member forming a support in a vertical plane, a block at the upper end of said brace provided with a closed recess to receive the end of said hub engaging member, supporting it laterally, and a horizontal brace between said block and the wall of said car.

3. A decking structure for securing automobiles in freight cars comprising, a brace member extending diagonally upward from the floor of the car and inwardly from the side thereof, the upper edge of said brace being provided with a recess to form a vertical support, a block secured to the upper end of said brace forming a lateral support, and a sleeve adapted to be screwthreaded on the hub of an automobile wheel and positioned in the recess of said brace with its outer end abutting said block.

4. A decking structure for securing automobiles in freight cars comprising, a brace member extending diagonally upward from the floor of the car and inwardly from the side thereof, the upper edge of said brace being provided with a recess to form a vertical support, a block secured to the upper end of said brace forming a lateral support, a sleeve adapted to be screwthreaded on the hub of an automobile wheel and positioned in the recess of said brace and its outer end abutting said block, and a horizontal brace between said block and the wall of said car.

5. A deck structure for securing automobiles in freight cars comprising, a hub engaging member, a brace member forming a support in a vertical plane, a block at the upper end of said brace member provided with an opening extending only partially into said block to receive the end of said hub engaging member, and a brace extending in a horizontal plane between said block and the wall of the freight car.

HARRY S. McCLELLAN.